(12) United States Patent
Miki et al.

(10) Patent No.: US 7,443,655 B2
(45) Date of Patent: Oct. 28, 2008

(54) CAPACITOR

(75) Inventors: Katsumasa Miki, Osaka (JP); Tatsuo Fujii, Osaka (JP); Yuji Midou, Osaka (JP); Suzushi Kimura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 211 days.

(21) Appl. No.: 11/597,812

(22) PCT Filed: Jul. 7, 2005

(86) PCT No.: PCT/JP2005/012553

§ 371 (c)(1),
(2), (4) Date: Nov. 28, 2006

(87) PCT Pub. No.: WO2006/008973

PCT Pub. Date: Jan. 26, 2006

(65) Prior Publication Data

US 2008/0024955 A1    Jan. 31, 2008

(30) Foreign Application Priority Data

Jul. 15, 2004 (JP) ............................. 2004-208148

(51) Int. Cl.
*H01G 5/38* (2006.01)
*H01G 4/228* (2006.01)
(52) U.S. Cl. .................... 361/541; 361/540; 361/523
(58) Field of Classification Search ............. 361/523, 361/528, 532, 540–541
See application file for complete search history.

(56) References Cited

U.S. PATENT DOCUMENTS 6,407,907 B1   6/2002  Ahiko et al.
6,466,430 B2 * 10/2002  Mido et al. ............... 361/529
6,785,147 B2 *  8/2004  Miki et al. ............... 361/760
6,822,849 B2 * 11/2004  Miki et al. ............... 361/523
6,855,177 B2 *  2/2005  Fujii et al. ............... 29/25.03
6,870,728 B1 *  3/2005  Burket et al. ............. 361/538

FOREIGN PATENT DOCUMENTS

| JP | 8-138974 | 5/1996 |
| JP | 2001-185442 | 7/2001 |
| JP | 2001-189234 | 7/2001 |
| JP | 2002-299152 | 10/2002 |
| JP | 2003-045762 | 2/2003 |
| JP | 2003-051427 | 2/2003 |

* cited by examiner

*Primary Examiner*—Eric Thomas
(74) *Attorney, Agent, or Firm*—Wenderoth, Lind & Ponack, L.L.P.

(57) ABSTRACT

A capacitor includes a first capacitor element and a second capacitor element laminated on this first capacitor element. The first capacitor element is a solid electrolytic capacitor including a through-hole electrode penetrating a valve metal sheet and having one surface on which cathode and anode terminal portions are taken out. The second capacitor element has first and second electrodes which are provided via a dielectric layer, and second through-hole electrodes penetrating the dielectric layer. The second through-hole electrodes are coupled to the first electrode and insulated from the second electrode. Lead-out portions of the second electrodes are exposed from the dielectric layer. The second through-hole electrodes and the lead-out portions are disposed alternately. The first electrode is electrically coupled to the first through-hole electrode and the second electrode is electrically coupled to the valve metal sheet.

35 Claims, 7 Drawing Sheets

CAPACITOR

This application is a U.S. national phase application of PCT international application PCT/JP2005/012553.

TECHNICAL FIELD

The present invention relates to a capacitor excellent in high-frequency property.

BACKGROUND ART

Recently, as electronic apparatuses have had higher functions, electronic components used therein have been demanded to have performance capable of corresponding to a high frequency range. For example, it is essential that a capacitor used as a bypass capacitor or a decoupling capacitor in a high frequency circuit should have a higher resonance frequency and a larger capacity. In order to obtain a higher resonance frequency, it is essential to reduce the equivalent series inductance (to lower ESL) of a capacitor. In particular, a decoupling capacitor used for CPU with significantly high performance is required to have performance capable of rapidly supplying a large electric power. In order to satisfy the requirement of such a high-speed operation, it is important to lower ESL of the capacitor.

A conventional capacitor excellent in high-frequency property is disclosed in, for example, Japanese Patent Unexamined Publication No. 2002-299152. On both ends of the disclosed ceramic capacitor, positive electrode terminals and negative electrode terminals are arranged alternately, thereby reducing ESL. In addition, a multilayer ceramic capacitor in which respective electrode terminals are arranged alternately in a matrix so as to reduce the inductance to lower ESL, is known. Such a capacitor is disclosed in, for example, Japanese Patent Unexamined Publication No. 2001-189234. Such capacitors have a devised electrode structure so that magnetic fields induced by electric current flowing in the capacitor can cancel each other. Furthermore, electric current path length in each of the electrode is shortened. The synergistic effect thereof reduces ESL.

However, since such a capacitor has a configuration in which the shape of internal electrodes and configuration of terminal electrodes are complicated, the capacity becomes smaller and the productivity is deteriorated.

SUMMARY OF THE INVENTION

A capacitor of the present invention includes a first capacitor element and a second capacitor element laminated on the first capacitor element. The first capacitor element includes a valve metal sheet, a dielectric film, a solid electrolytic layer, a collector layer, and a first through-hole electrode. On one side of the valve metal sheet, a porous layer is provided. The dielectric film is formed on the porous layer. The solid electrolytic layer is formed on the dielectric film. The collector layer is formed on the solid electrolytic layer. The first through-hole electrode conducts with the collector layer, is electrically insulated from the valve metal sheet, and penetrates the valve metal sheet. The second capacitor element includes a dielectric layer, a first electrode, a second electrode, a plurality of second through-hole electrodes and a plurality of lead-out portions of the second electrode. The first electrode and the second electrode are provided in such a manner as to be electrically insulated from each other via the dielectric layer. The first electrode is electrically connected to the first through-hole electrode, and the second electrode is electrically connected to the valve metal sheet. The second through-hole electrode is provided in such a manner as to penetrate the dielectric layer, to be coupled to the first electrode and electrically insulated from the second electrode. The lead-out portions of the second electrode are exposed from the dielectric layer. The second through-hole electrodes and the lead-out portions are arranged alternately. This capacitor is configured by combining the first capacitor element having a large electrostatic capacity and the second capacitor element having a low ESL property. Therefore, it is possible to obtain a capacitor securing a large capacity and having a low ESL property.

DETAILED DESCRIPTION OF THE PREFERRED EMBODIMENT

First Exemplary Embodiment

Figure 1:
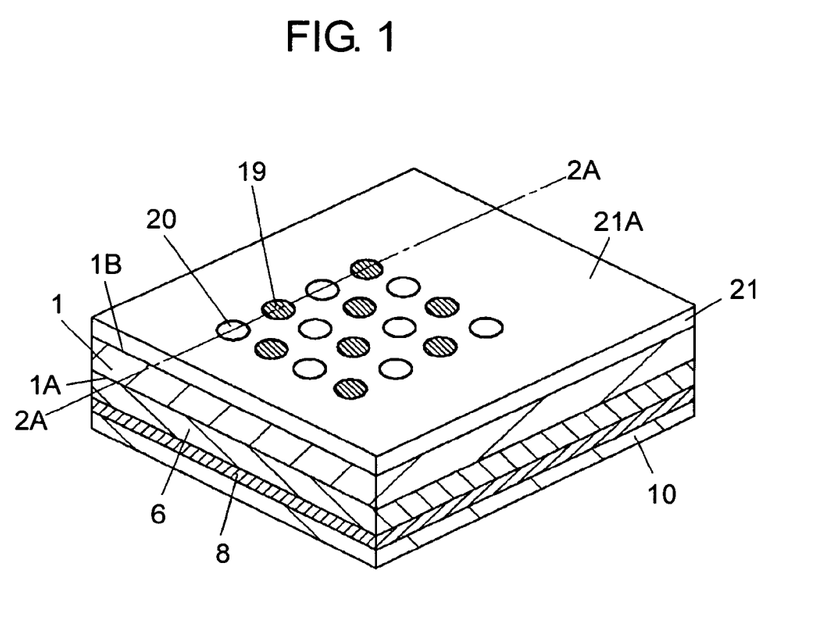
FIG. 1 is an outside perspective view showing a capacitor in accordance with a first exemplary embodiment of the present invention.
Figure 2A:
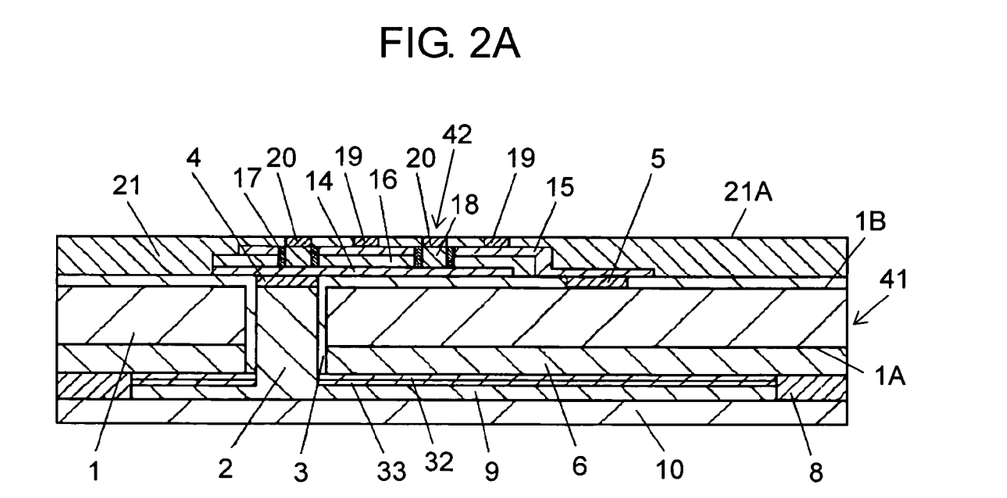
FIG. 2A is a sectional view showing a structure of the capacitor shown in FIG. 1.
Figure 2B:
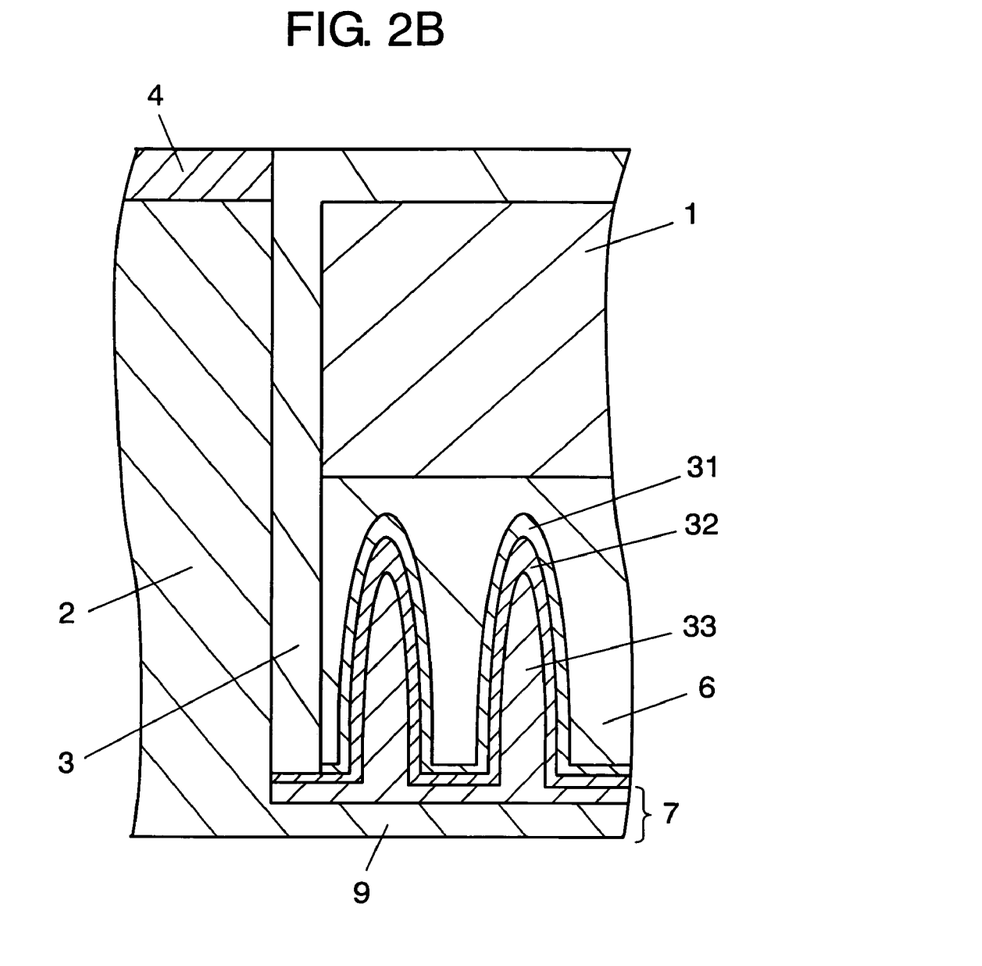
FIG. 2B is an enlarged view showing a main part of the capacitor shown in FIG. 2A.
Figure 2C:
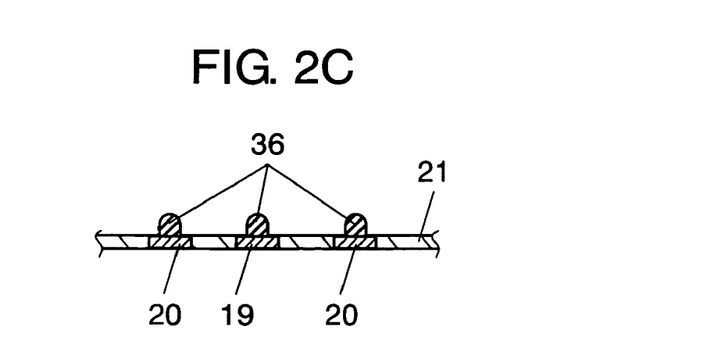
FIG. 2C is an enlarged view showing a main part of an upper surface of another capacitor in accordance with the first exemplary embodiment of the present invention.
Figure 3A:
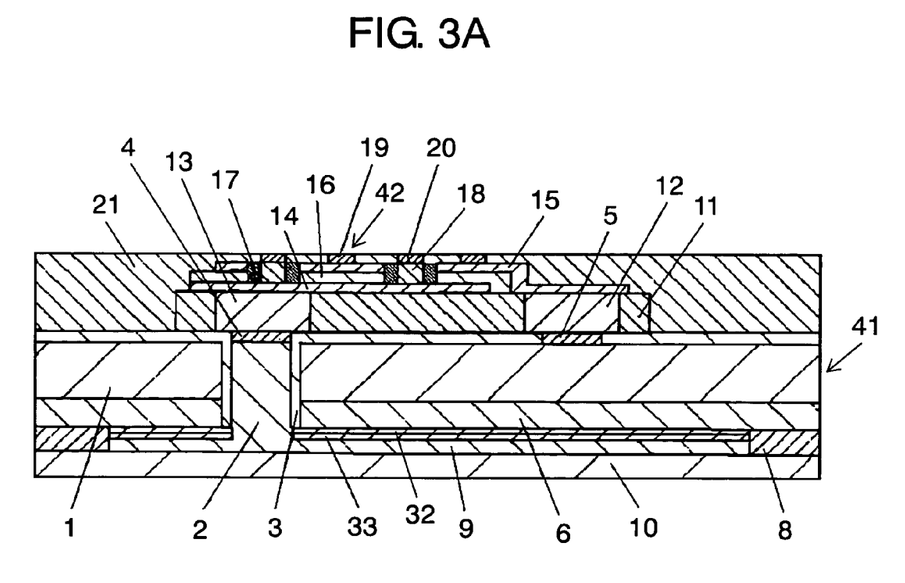
FIG. 3A is another sectional view showing a structure of the capacitor in accordance with the first exemplary embodiment of the present invention.
Figure 3B:
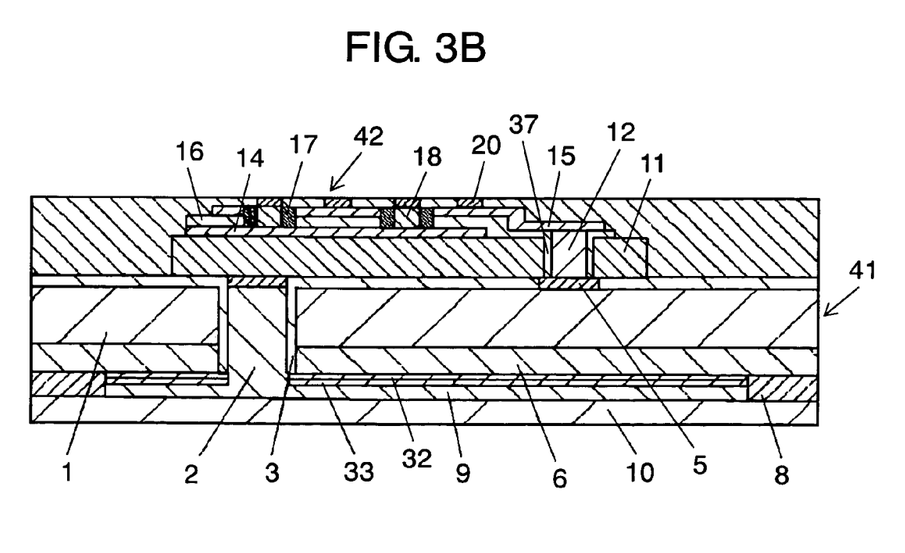
FIG. 3B is a further sectional view showing a structure of the capacitor in accordance with the first exemplary embodiment of the present invention.

FIG. 1 is an outside perspective view showing a capacitor in accordance with a first exemplary embodiment of the present invention. FIG. 2A is a sectional view showing a structure taken along line 2A-2A of FIG. 1. FIG. 2B is an enlarged view showing a main part of FIG. 2A. FIG. 2C is an enlarged view showing a main part of an upper surface of another capacitor in accordance with the first exemplary embodiment. FIG. 3A is a sectional view showing a structure of another example of a capacitor in accordance with the first exemplary embodiment. FIG. 3B is a sectional view showing a structure of a further example of a capacitor.

In FIGS. 1, 2A and 2B, valve metal sheet (hereinafter, referred to as "sheet") 1 has porous layer 6, having a large number of pores, at the side of first surface 1A. On the surface of porous layer 6, dielectric film 31 is formed. These are formed by subjecting, for example, aluminum (Al) to treatment with a chemical solution and thermal oxidation. As sheet 1, in addition to Al, tantalum (Ta) and niobium (Nb) are preferred from the viewpoint of electrostatic capacity.

On the surface of dielectric film 31, solid electrolytic layer 32 is formed. In FIG. 2A, dielectric film 31 is not shown. On the surface of solid electrolytic layer 32, collector layer 7 is formed. Collector layer 7 includes carbon layer 33 and cathode electrode layer 9 formed on carbon layer 33. Cathode electrode layer 9 is made of silver (Ag) paste, and the like. Solid electrolytic layer 32 can be formed by a polymerization method of a conductive polymer such as polypyrrole, polythiophene, and the like. Carbon layer 33 is used in order to reduce the interface resistance between solid electrolytic layer 32 and cathode electrode layer 9.

Furthermore, sheet 1 is provided with first through-hole electrode 2 penetrating sheet 1 from the side of first surface 1A to the side of second surface 1B opposing first surface 1A. Through-hole electrode 2 electrically conducts with cathode electrode layer 9. On the inner wall of a through hole in which through-hole electrode 2 is made and on the most part of the side of the second surface of sheet 1, insulating film 3 is formed. Insulating film 3 insulates through-hole electrode 2 from sheet 1 electrically. Furthermore, anode-cathode separating portion 8 formed on the outer peripheral portion of the side of first surface 1A of sheet 1 prevents solid electrolytic layer 32 and collector layer 7 from being brought into conduction with sheet 1 at the end thereof, so as to improve the reliability of the capacitor.

Reinforcing plate 10 attached to cathode electrode layer 9 enforces the entire mechanical strength. Anode-cathode separating portion 8 and reinforcing plate 10 are not essential components and they may be provided if necessary.

On an exposed surface of through-hole electrode 2 at the side of second surface 1B of sheet 1, cathode terminal 4 is formed. Insulating film 3 formed on second surface 1B of sheet 1 has an opening in a part thereof. In this opening, anode terminal 5 conducting with sheet 1 is provided. Note here that terminals 4 and 5 are not necessarily required. However, by providing terminals 4 and 5, the connection reliability is enhanced. With such a configuration, first capacitor element 41 is formed.

Next, a configuration of second capacitor element 42 is described. Capacitor element 42 is provided at the side of second surface 1B of sheet 1 constituting capacitor element 41. Firstly, lower electrode 14 made of a metal having an excellent conductivity, for example, copper (Cu), is formed by using, for example, a thin film process so that lower electrode 14 is connected to cathode terminal 4 of capacitor element 41. Next, on lower electrode 14, dielectric layer 16 made of a thin film of a dielectric material such as barium titanate, is formed by, for example, a sputtering method. Then, on dielectric layer 16, upper electrode 15 is provided so that it is connected to anode terminal 5 of capacitor element 41. Thus, lower electrode 14, dielectric layer 16 and upper electrode 15 are laminated. In the case where terminals 4 and 5 are not provided, lower electrode 14 is directly connected to through-hole electrode 2, and upper electrode 15 is directly connected to sheet 1, respectively. That is to say, lower electrode 14 as a first electrode and upper electrode 15 as a second electrode are provided in such a manner as to be electrically insulated from each other via dielectric layer 16. Lower electrode 14 is electrically coupled to through-hole electrode 2 and upper electrode 15 is electrically coupled to sheet 1, respectively.

In the parts of dielectric layer 16 and upper electrode 15, a through hole is provided. Second through-hole electrode 18 connected to lower electrode 14 is provided in this through hole. Insulating portion 17 provided on the inner wall of the through hole electrically insulates through-hole electrode 18 from upper electrode 15. That is to say, through-hole electrode 18 is provided in such a manner as to penetrate dielectric layer 16, to be coupled to lower electrode 14 and insulated from upper electrode 15. On through-hole electrode 18, first terminal electrode 20, which is exposed to outer surface 21A and coupled to through-hole electrode 18, may be provided if necessary. On upper electrode 15, second terminal electrode 19, which is exposed to outer surface 21A and coupled to a lead-out portion of upper electrode 15, may be provided. Thus, capacitor element 42 is configured.

Capacitor element 42 is characterized by the arrangement of an electrode lead-out portion from upper electrode 15 and an electrode lead-out portion from through-hole electrode 18 coupled to lower electrode 14, which are exposed to outer surface 21A of insulating protective layer 21. In FIG. 1, the electrode lead-out portions correspond to terminal electrodes 19 and 20, respectively. Terminal electrodes 19 and 20 are provided so that they alternate with each other as shown in FIG. 1. In the case where terminal electrodes 19 and 20 are not provided, through-hole electrode 18 may be exposed to outer surface 21A, and a protrusion integrated with upper electrode 15 may be provided on a place corresponding to terminal electrode 19. With such a configuration, ESL of capacitor element 42 is extremely reduced.

A capacitor including capacitor elements 41 and 42 and having the above-mentioned configuration can be used as a decoupling capacitor for MPU and the like. In such an application of use, power supply ability that plays an important role in a rapid voltage change in MPU at the initial stage is determined depending upon the ESL property.

The capacitor that plays a role in a power supply necessary for the initial stage requires a low ESL property. The necessary electrostatic capacity is about 50 nF. Therefore, it is necessary that the electric current path length in capacitor element 42 in this exemplary embodiment be made to be as short as possible. Furthermore, designing is needed to be carried out by giving a high priority to the reduction of ESL property by devising the arrangement of terminal electrodes 19 and 20. With the above-mentioned configuration of capacitor element 42, such conditions can be satisfied. Designing the electrostatic capacity of capacitor element 42 to be about 50 nF enables power supply necessary for the initial stage.

On the other hand, for the power supply at the next stage, a large electrostatic capacity is required. To satisfy this requirement, capacitor element 41 supplies large amount of electric charges. Therefore, capacitor element 41 is needed to be a capacitor having reduced equivalent series resistance (low ESR) property and a large capacity. Since capacitor element 41 is a solid electrolyte capacitor, it is suitable for such an application requiring a large capacity.

As mentioned above, in the capacitor in accordance with this exemplary embodiment, capacitor element 41 has a large capacity and capacitor element 42 has a low ESL property. When the functions are assigned to each element in this way, it is possible to efficiently obtain a capacitor having a large capacity and a low ESL property without sacrificing electrostatic capacity. Furthermore, with such a configuration, it is possible to obtain an extremely thin capacitor used in the high frequency range. Note here that it is preferable that capacitor element 42 be formed as a thin film capacitor in which dielectric layer 16 and electrodes 14 and 15 are formed by a thin film formation method as mentioned above. This enables the pitch between terminal electrode 19 and terminal electrode 20 to be fine with high precision.

In the above-mentioned description, capacitor element 42 is directly formed on capacitor element 41 by using a thin film process. Other than this, another capacitor having the same function as that of capacitor element 42 has been produced separately, and the formed capacitor may be laminated on capacitor element 41. In this case, the respective combinations between cathode terminal 4 and lower electrode 14 and between anode terminal 5 and upper electrode 15 are electrically connected by using an Ag paste, a Cu paste or an anisotropic conductive paste. At this time, when capacitor element 41 and capacitor element 42 are bonded to each other with an adhesive agent, and the like, the reliability is enhanced. In such a production process, since separately produced capacitor elements are laminated and bonded to each other finally, the yield of the final products can be increased.

When capacitor element 42 is made of an organic film capacitor, a capacitor excellent in stress resistance can be obtained. When capacitor element 42 is made of a ceramic capacitor, it is possible to obtain a capacitor having both low ESR property and low ESL property. When capacitor element 42 is made of a solid electrolytic capacitor, capacitor element 42 can be produced in the similar process to that of capacitor element 41, so that it is possible to obtain a capacitor having a large capacity and excellent productivity.

Furthermore, as shown in FIG. 2C, it is preferable that connecting bumps 36 be provided on terminal electrodes 19 and 20. When terminal electrodes 19 and 20 are not provided, connecting bumps 36 may be provided on through-hole electrode 18 and the lead-out portion of upper electrode 15. Thus, a semiconductor device and capacitor element 42 can be directly connected to each other with the shortest distance. Consequently, the power supply performance in the high frequency range is enhanced. Furthermore, when the distance between terminal electrodes 19 and 20 in capacitor element 42 is made to be shorter than the distance between anode terminal 5 and cathode terminal 4 in capacitor element 41, a capacitor excellent in low ESL property can be obtained.

When cathode terminal 4 and lower electrode 14 are connected to each other by soldering while anode terminal 5 and upper electrode 15 are connected to each other by soldering, the mounting property and reliability are improved. When cathode terminal 4 and lower electrode 14 are connected to each other by using a conductive adhesive agent while anode terminal 5 and upper electrode 15 are connected to each other by using a conductive adhesive agent, productivity is improved. The respective combinations between anode terminal 5 and upper electrode 15 and between cathode terminal 4 and lower electrode 14 may be connected by using an anisotropic conductive paste. Thus, terminal electrodes 19 and 20 can be arranged at a narrow pitch.

Furthermore, when sheet 1 is made of any of Al, Ta and Nb, a capacitor having a large capacity can be obtained by using a conventional technology. When anode terminal 5, cathode terminal 4, and terminal electrodes 19 and 20 are formed of a conductive paste containing Ag, Cu, a mixture of Ag and Cu, or an alloy of Ag and Cu, as a main component, productivity is improved. If necessary, they may be made of separate materials.

Next, a configuration of a capacitor of another example in accordance with this exemplary embodiment is described with reference to FIG. 3A. Herein, a capacitor shown in FIG. 3A is different from the capacitor shown in FIG. 1 in that substrate 11 is provided between capacitor elements 41 and 42. Also in FIG. 3A, the same as in FIG. 2A, a dielectric film is not shown.

Substrate 11 includes first penetrating electrode 12 and second penetrating electrode 13. Penetrating electrode 13 is provided so as to be connected to lower electrode 14. Dielectric layer 16 is provided on lower electrode 14. Upper electrode 15 is provided on dielectric layer 16, and is connected to penetrating electrode 12. Cathode terminal 4 and anode terminal 5 are connected to penetrating electrodes 13 and 12, respectively. That is to say, through-hole electrode 2 and lower electrode 14 are electrically coupled to each other via penetrating electrode 13. Sheet 1 and upper electrode 15 are electrically coupled to each other via penetrating electrode 12. Terminal electrodes 19 and 20 of capacitor element 42 are arranged in the same way as in FIG. 2A. Thus, by coupling the capacitor elements that satisfy the respective properties, the yield can be improved. When such capacitors are produced, capacitor element 42 has been formed on substrate 11, and then this connected product is coupled to and mounted on capacitor element 41.

When an electrically insulating material is used for substrate 11, capacitor element 42 can be formed on substrate 11 by a thin film formation method. After the properties of capacitor element 42 are examined, capacitor element 42 is mounted on capacitor element 41 while the properties are ascertained. Thus, a capacitor having desired properties can be effectively obtained with high precision. Furthermore, when insulating substrate 11 is made of an organic material, productive efficiency is improved. The use of an organic material including at least one of polyimide resin, epoxy resin, phenol resin, silicon resin, and the like, improves the reliability and productivity.

Substrate 11 may be made of an inorganic material. When substrate 11 is made of an insulating material including any one of alumina, glass, quartz and ceramic, a capacitor having a high reliability such as thermal resistance can be obtained.

On the other hand, as shown in FIG. 3B, substrate 11 may be made of conductive metallic materials such as Cu, Ag, silicon (Si), and the like. In this case, the expansion coefficient of substrate 11 becomes similar to that of sheet 1 in capacitor element 41 that is similarly made of a metallic material. As a result, not only the reliability but also the heat dissipation property is improved. Also in FIG. 3B, as in FIG. 2A, a dielectric film is not shown.

Furthermore, substrate 11 is made of a conductive material, one of penetrating electrodes 12 and 13 can be omitted. As shown in FIG. 3B, for example, penetrating electrode 13 becomes unnecessary. However, it is necessary to provide insulating film 37 so as to prevent upper electrode 15 and penetrating electrode 12 from conducting with substrate 11. Such a configuration can be obtained as follows. That is to say, for example, Cu substrate is used as substrate 11, and substrate 11 is provided with a through hole by dry etching. Then, lower electrode 14 and dielectric layer 16 are formed sequentially on substrate 11 by a technique such as sputtering, vapor deposition, and the like. At this time, insulating film 37 is formed by forming a part of dielectric layer 16 inside the through hole and on the periphery of the through hole. Next, inside the through hole, penetrating electrode 12 is formed by using an Ag nanopaste, and the like. Finally, upper electrode 15 is formed by a technique such as sputtering, vapor deposition, and the like. Thus, capacitor element 42 can be made as a lamination in a form of a uniform thin film. Alternatively, as mentioned below, through holes for forming penetrating electrodes 12 and 13 are formed, followed by thermal treatment oxidation. Thereby, an insulating film made of oxide may be formed on the surface of substrate 11.

In the capacitors shown in FIGS. 3A and 3B, when substrate 11 and capacitor element 41 are bonded to each other with an adhesive agent, productivity is improved.

Hereinafter, one example of a method for manufacturing the capacitor shown in FIG. 3A is described. Firstly, a method for manufacturing capacitor element 41 is described with reference to FIGS. 4 and 7.

Figure 4:
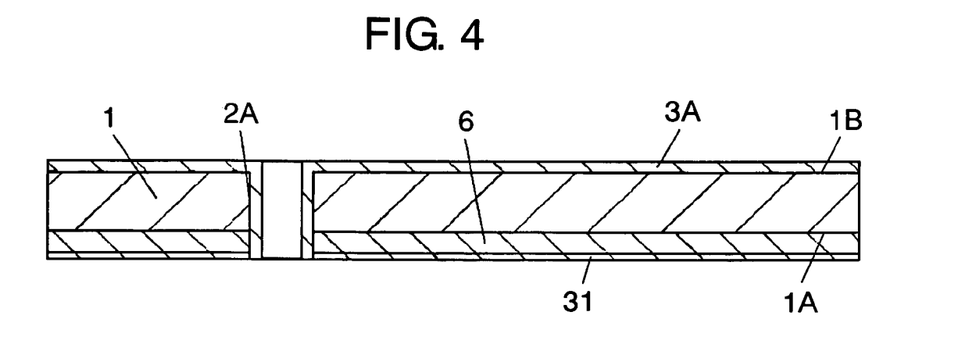
FIG. 4 is a sectional view showing a process of a manufacturing method of a first capacitor element in the capacitor in accordance with the first exemplary embodiment of the present invention.

Firstly, sheet 1 having porous layer 6 on first surface 1A thereof is prepared. Porous layer 6 can be obtained by subjecting sheet 1 made of, for example, Al to acid treatment and thermal oxidation treatment. With such treatments, dielectric layer 31 is also formed on the surface of porous layer 6. Then, sheet 1 is provided with through hole 2A by, for example, a punching process. Next, insulating material 3A made of a resin material is applied on sheet 1 from the side of second surface 1B. At this time, resin material 3A is also filled in the inside of through hole 2A in addition to the surface of sheet 1 at the side of second surface 1B. Then, as shown in FIG. 4, air is injected from the side of first surface 1A of sheet 1 so as to remove an excessive portion of resin material 3A in through hole 2A. Thereby, through hole 2A is made to be thirled again. Then, resin material 3A is hardened by heating. Insulating film 3 in FIG. 3A can be formed in this way.

Figure 5:
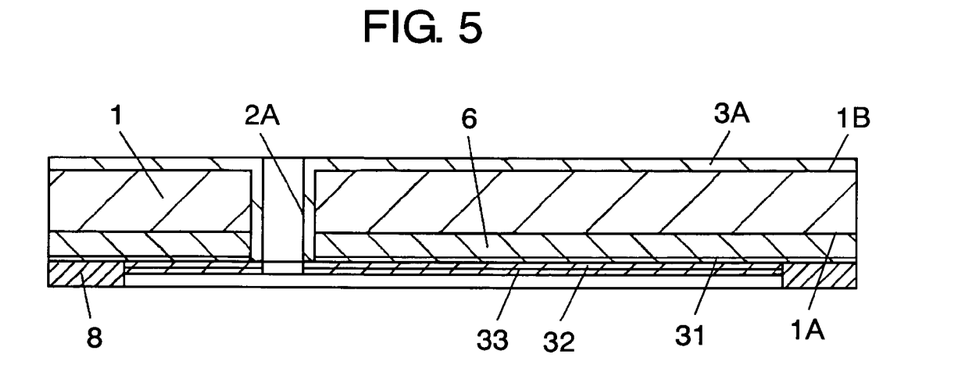
FIG. 5 is a sectional view showing a process of the manufacturing method of the first capacitor element following FIG. 4.

Thereafter, as shown in FIG. 5, resin is applied and hardened on the peripheral portion at the side of first surface 1A of the sheet 1 so as to form anode-cathode separating portion 8, if necessary. Furthermore, solid electrolytic layer 32 is formed on dielectric layer 31 by a chemical polymerization method, an electrolytic polymerization method, or the like for a conductive polymer film such as polythiophene. On solid electrolytic layer 32, a carbon paste is coated and hardened so as to form carbon layer 33.

Figure 6:
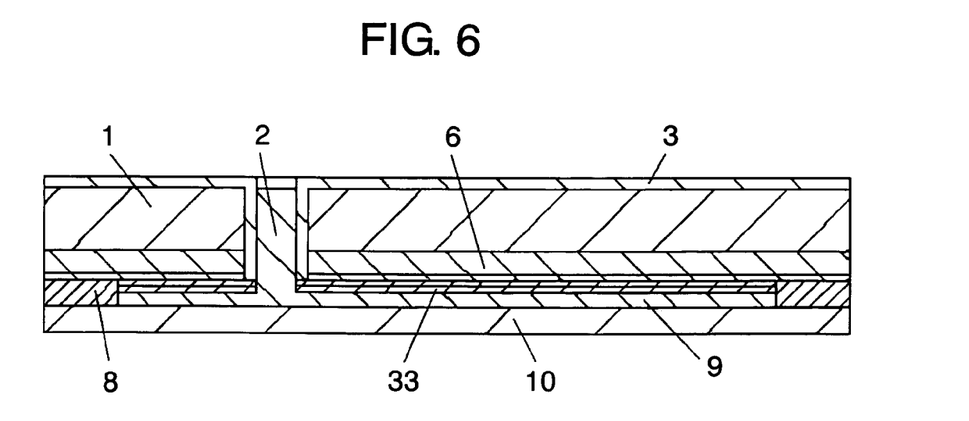
FIG. 6 is a sectional view showing a process of the manufacturing method of the first capacitor element following FIG. 5.

Thereafter, as shown in FIG. 6, an Ag paste is coated on carbon layer 33 and filled in through hole 2A. Thus, through-hole electrode 2 and cathode electrode layer 9 are formed. At this time, if necessary, conductive reinforcing plate 10 made of Ag, Cu, or the like, may be attached to cathode electrode layer 9 with an Ag paste. Thus, the mechanical strength of capacitor element 41 is improved and the resistance value is reduced, thereby facilitating the extraction of electric charges.

Figure 7:
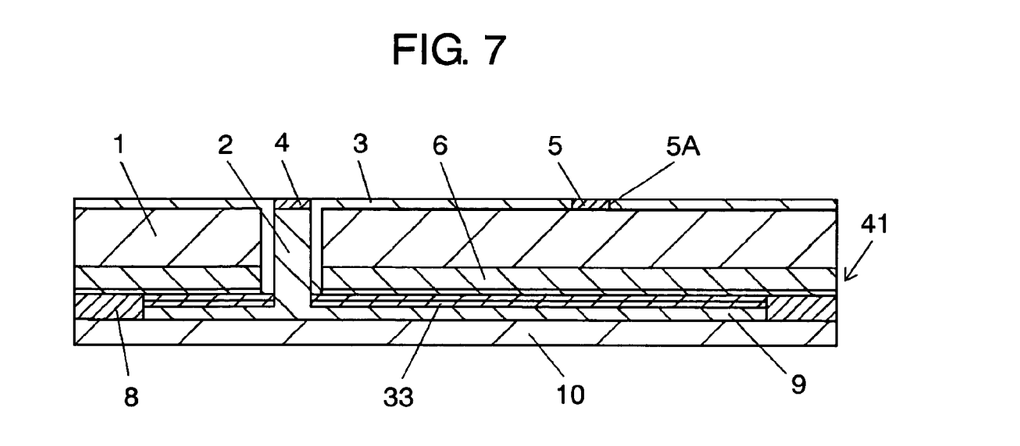
FIG. 7 is a sectional view showing a process of the manufacturing method of the first capacitor element following FIG. 6.

Next, a predetermined position of insulating film 3 is processed by, for example, laser processing so as to form anode opening 5A and allow the surface layer of sheet 1 to be exposed. Thereafter, as shown in FIG. 7, terminals 4 and 5 are formed on the exposed surface of through-hole electrode 2 and anode opening 5A by, for example, plating. As mentioned above, capacitor element 41 can be formed.

Figure 8:
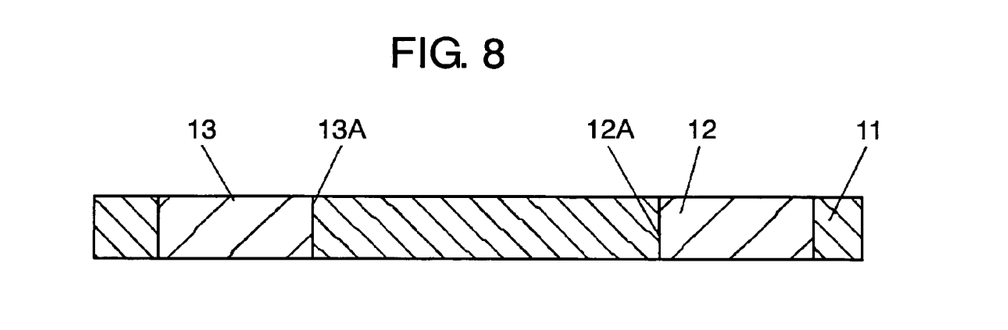
FIG. 8 is a sectional view showing a process of a manufacturing method of a second capacitor element in the capacitor in accordance with the first exemplary embodiment of the present invention.

Next, a method for producing capacitor element 42 on substrate 11 is described with reference to FIGS. 8 to 13. Firstly, substrate 11 that is a Si plate is provided with patterned resist (not shown). Then, through holes 12A and 13A are formed on predetermined sites by, for example, dry etching. Then, substrate 11 is oxidized by thermal treatment, so that an $SiO_2$ insulating film (not shown) is formed on substrate 11. Next, as shown in FIG. 8, an Ag nanopaste and the like is filled in through holes 12A and 13A, and hardened. Thus, penetrating electrodes 12 and 13 are formed.

Figure 9:
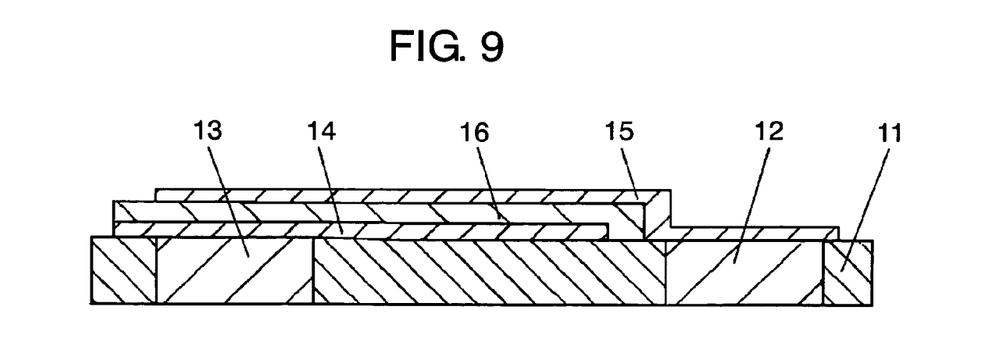
FIG. 9 is a sectional view showing a process of the manufacturing method of the second capacitor element following FIG. 8.

Next, as shown in FIG. 9, lower electrode 14 made of Cu, dielectric layer 16 containing barium titanate as a main component, and upper electrode 15 made of Cu are sequentially formed by, for example, a sputtering method. Each of them is formed in a predetermined shape by limiting a film formation site by using a metal mask, or by forming a film on the entire surface, followed by forming into a predetermined shape by a photolithography method or an etching method.

Figure 10:
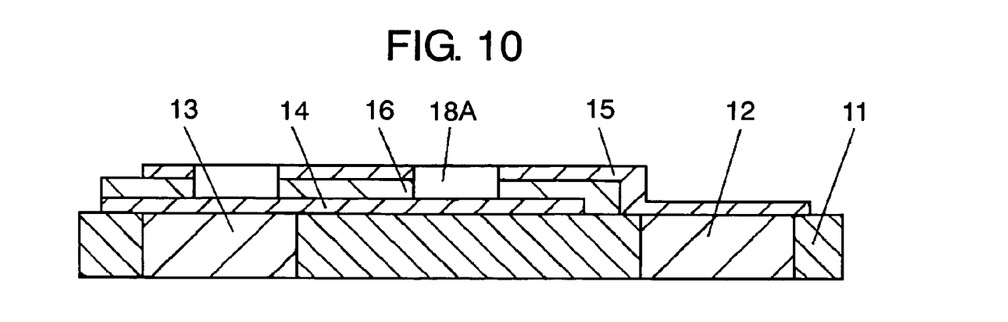
FIG. 10 is a sectional view showing a process of the manufacturing method of the second capacitor element following FIG. 9.
Figure 11:
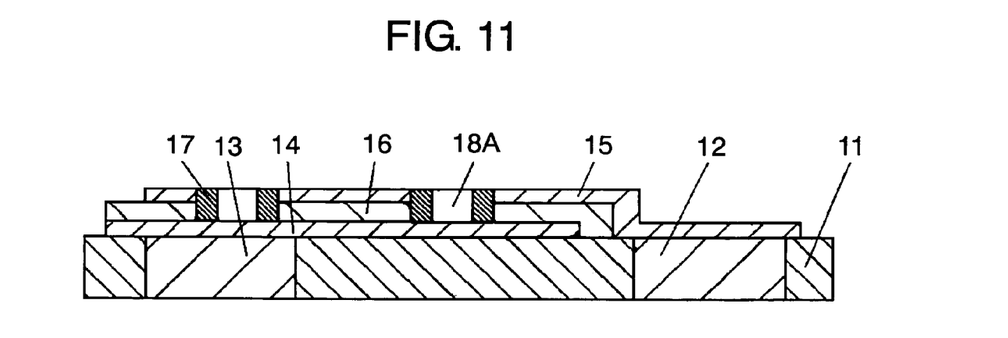
FIG. 11 is a sectional view showing a process of the manufacturing method of the second capacitor element following FIG. 10.

Thereafter, as shown in FIG. 10, blind via 18A is formed in a predetermined position. Blind via 18A is formed by laser processing or etching. As shown in FIG. 11, insulating portion 17 is formed on the inner wall of blind via 18A. Insulating portion 17 can be formed by provisionally hardening photo-sensitive polyimide or the like, followed by really hardening by carrying out exposing and developing so that the polyimide remains on only a predetermined position.

Figure 12:
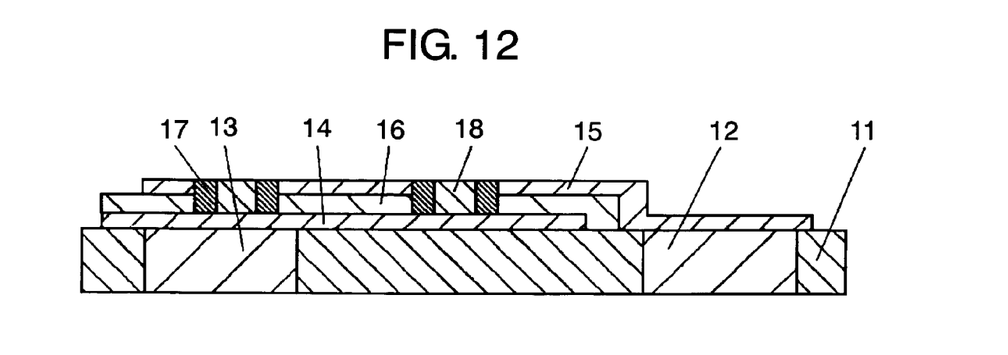
FIG. 12 is a sectional view showing a process of the manufacturing method of the second capacitor element following FIG. 11.
Figure 13:
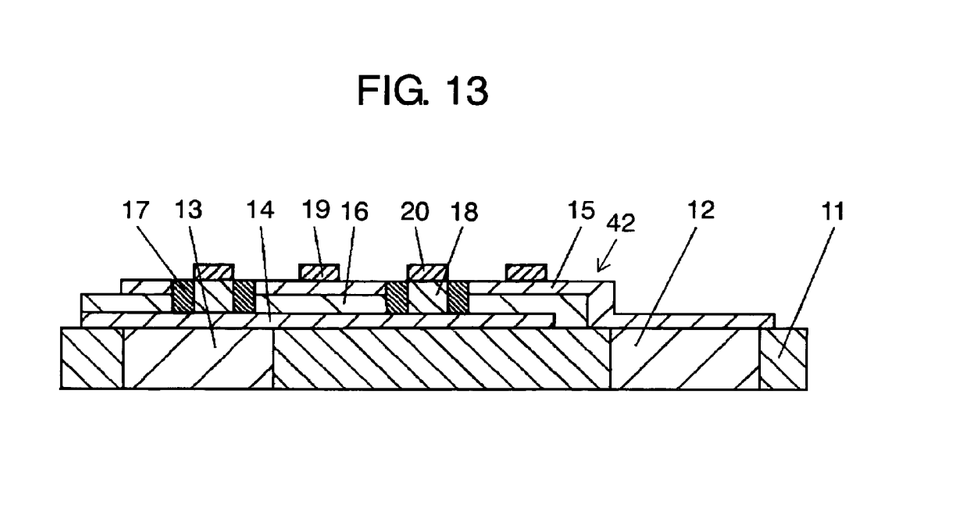
FIG. 13 is a sectional view showing a process of the manufacturing method of the second capacitor element following FIG. 12.

Next, as shown in FIG. 12, an Ag paste or a Cu paste is filled by printing in blind via 18A and hardened so as to form through-hole electrode 18. Then, as shown in FIG. 13, terminal electrodes 20 and 19 are formed on through-hole electrode 18 and on the predetermined site of upper electrode 15, respectively. Thus, capacitor element 42 is manufactured. Terminal electrodes 19 and 20 can be formed by a sputtering method, a photolithography method, or an etching method.

Capacitor elements 41 and 42 mentioned above are laminated and coupled to each other via substrate 11. At this time, cathode terminal 4 and lower electrode 14 are coupled in such a manner as to conduct with each other via penetrating electrode 13, and anode terminal 5 and upper electrode 15 are coupled in such a manner as to conduct with each other via penetrating electrode 12, respectively with a paste or the like. Thus, the capacitor is completed. Furthermore, if necessary, as shown in FIG. 3A, by forming insulating protective layer 21, a capacitor having an improved reliability and validity can be produced.

As mentioned above, in the capacitor in accordance with this exemplary embodiment, capacitor element 42 realizes a low ESL property and capacitor element 41 secures a large capacity. Therefore, a capacitor excellent in a high-frequency property can be obtained. In this way, by combining capacitor elements having different properties, a capacitor can be used for various applications. That is to say, each of these capacitor elements has a through-hole electrode inside thereof, so that opposite flows of electrical current are induced. Therefore, magnetic fields generated by electrical currents can cancel by themselves. Thus, the value of ESL caused by magnetic field can be minimized. In particular, since capacitor element 42 has a plurality of through-hole electrodes 18, this effect can be achieved significantly. By combining such a capacitor element 42 and capacitor element 41 having a large capacity, the capacitor can be applied to electronic apparatuses requiring highly precise mounting technology.

Second Exemplary Embodiment

Figure 14:
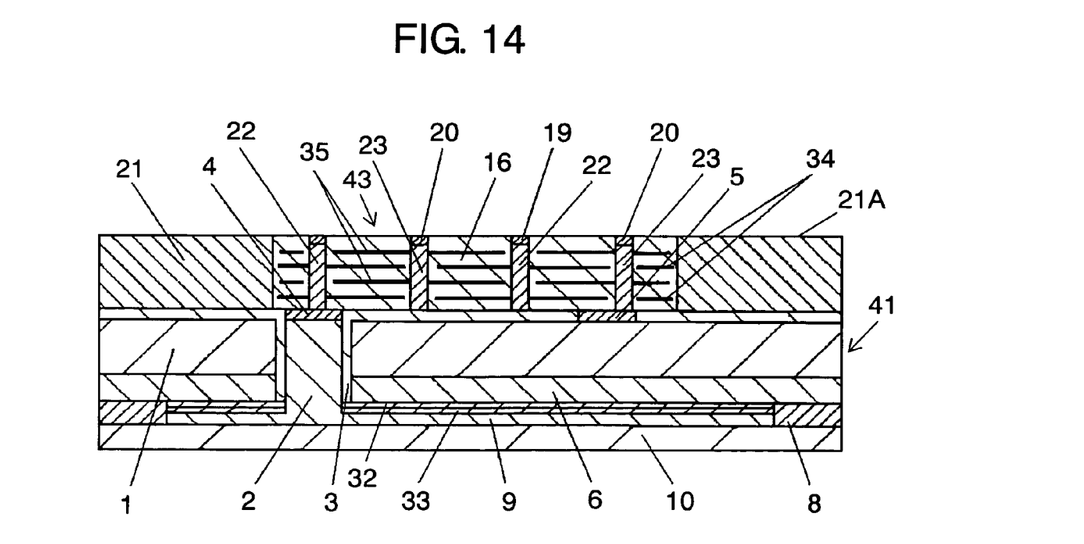
FIG. 14 is a sectional view showing a structure of a capacitor in accordance with a second exemplary embodiment of the present invention.

FIG. 14 is a sectional view showing a capacitor in accordance with a second exemplary embodiment of the present invention. Capacitor element 41 is the same as in the first exemplary embodiment. Capacitor element 43 that is a second capacitor element is different from capacitor element 42 of the first exemplary embodiment in that capacitor element 43 has a laminated structure. Also in FIG. 14, as in FIG. 2A, a dielectric film is not shown.

In capacitor element 43, inner layer electrodes 34 that are first electrodes and inner layer electrodes 35 that are second electrodes are provided in an inner layer of dielectric layer 16. In other words, inner layer electrodes 34 and inner layer electrodes 35 are formed alternately via dielectric layer 16. Second through-hole electrodes 22 conduct with inner layer electrodes 34. Third through-hole electrodes (hereinafter, referred to as "through-hole electrodes") 23 conduct with inner layer electrodes 35 and are insulated from inner layer electrodes 34. Through-hole electrodes 22 and 23 penetrate dielectric layer 16 macroscopically. Inner layer electrodes 34 and 35 are patterned so that they are not short-circuited via through-hole electrodes 22 and 23. In FIG. 14, each of through-hole electrodes 22 seems to be separated from each other. However, they are electrically coupled with each other via inner layer electrodes 34. At the side of outer surface 21A of each of inner layer electrodes 34 and 35, terminal electrodes 19 and 20 are provided respectively.

Any of through-hole electrodes 23 is coupled to anode terminal 5 of capacitor element 41, and any of through-hole electrodes 22 is coupled to cathode terminal 4. Therefore, inner layer electrodes 34 are coupled to anode terminal 5 of capacitor element 41, and inner layer electrodes 35 are coupled to cathode terminal 4.

By laminating and connecting laminated capacitor element 43 having such a configuration and capacitor element 41, a larger capacity and lower ESR can be achieved. Therefore, a capacitor having more excellent properties can be obtained. An example of capacitor element 43 having such a laminated configuration can include a thin film capacitor, an organic film capacitor, a laminated ceramic capacitor, and the like.

INDUSTRIAL APPLICABILITY

A capacitor of the present invention is excellent in productivity and enables low ESL and a large capacity. Therefore, the capacitor can be applied to electronic apparatuses, for example, a decoupling capacitor for MPU or the like which requires a low impedance property.

The invention claimed is:
1. A capacitor comprising:
a first capacitor element including:
    a valve metal sheet having a porous layer on a first surface thereof,
    a dielectric film formed on the porous layer,
    a solid electrolytic layer formed on the dielectric film,
    a collector layer formed on the solid electrolytic layer,
    a first through-hole electrode conducting with the collector layer, being insulated from the valve metal sheet, and penetrating the valve metal sheet from the first surface to a second surface opposing the first surface, and
    an insulating film provided on the second surface and electrically insulating the first through-hole electrode from the valve metal sheet; and
a second capacitor element including:
    a dielectric layer,
    a first electrode electrically coupled to the first through-hole electrode and a second electrode electrically coupled to the valve metal sheet, the first electrode and the second electrode being insulated from each other via the dielectric layer,
    second through-hole electrodes penetrating the dielectric layer, being coupled to the first electrode, and being insulated from the second electrode, and
    lead-out portions of the second electrode exposed from the dielectric layer,
wherein the second through-hole electrodes and the lead-out portions are arranged alternately, and the second capacitor element is laminated on a side of the second surface of the valve metal sheet constituting the first capacitor element.

2. The capacitor according to claim 1, wherein the first electrode, the dielectric layer and the second electrode are laminated in the second capacitor element.

3. The capacitor according to claim 2, wherein the second capacitor element is a thin film capacitor.

4. The capacitor according to claim 2, wherein the second capacitor element is an organic film capacitor.

5. The capacitor according to claim 2, wherein the second capacitor element is a ceramic capacitor.

6. The capacitor according to claim 2, wherein the second capacitor element is a solid electrolytic capacitor.

7. The capacitor according to claim 1, further comprising connecting bumps respectively provided on the second through-hole electrodes and the lead-out portions.

8. The capacitor according to claim 1, wherein the first capacitor element further comprises a cathode terminal exposed to the second surface and coupled to the first through-hole electrode.

9. The capacitor according to claim 8, wherein the cathode terminal is formed of a conductive paste containing any of silver, copper, a mixture of silver and copper, and an alloy of silver and copper, as a main component.

10. The capacitor according to claim 1, wherein the first capacitor element further comprises an anode terminal exposed to the second surface and coupled to the valve metal sheet.

11. The capacitor according to claim 10, wherein the anode terminal is formed of a conductive paste containing any of silver, copper, a mixture of silver and copper, and an alloy of silver and copper, as a main component.

12. The capacitor according to claim 1, wherein
the first capacitor element further comprises a cathode terminal exposed to the second surface and coupled to the first through-hole electrode, and an anode terminal exposed to the second surface and coupled to the valve metal sheet; and
the cathode terminal is connected to the first electrode, and the anode terminal is connected to the second electrode, respectively, by soldering.

13. The capacitor according to claim 1, wherein
the first capacitor element further comprises a cathode terminal exposed to the second surface and coupled to the first through-hole electrode, and an anode terminal exposed to the second surface and coupled to the valve metal sheet; and
the cathode terminal is connected to the first electrode, and the anode terminal is connected to the second electrode, respectively, with a conductive adhesive agent.

14. The capacitor according to claim 1, wherein the second capacitor element further comprises first terminal electrodes exposed to an outer surface, each of the first terminal electrodes being coupled to one of the second through-hole electrodes.

15. The capacitor according to claim 14, wherein the first terminal electrodes are formed of a conductive paste containing any of silver, copper, a mixture of silver and copper, and an alloy of silver and copper, as a main component.

16. The capacitor according to claim 1, wherein the second capacitor element further comprises second terminal electrodes exposed to an outer surface, each of the second terminal electrodes being coupled to one of the lead-out portions.

17. The capacitor according to claim 16, wherein the second terminal electrodes are formed of a conductive paste containing any of silver, copper, a mixture of silver and copper, and an alloy of silver and copper, as a main component.

18. The capacitor according to claim 16,
wherein the second capacitor element further comprises:
first terminal electrodes exposed to the outer surface, each of the first terminal electrodes being coupled to one of the second through-hole electrodes; and
connecting bumps, each of the connecting bumps being provided on one of the first terminal electrodes and the second terminal electrodes.

19. The capacitor according to claim 16, wherein
the first capacitor element further comprises a cathode terminal exposed to the second surface and coupled to the first through-hole electrode, and an anode terminal exposed to the second surface and coupled to the valve metal sheet,
the second capacitor element further comprises first terminal electrodes exposed to an outer surface, each of the first terminal electrodes being coupled to one of the second through-hole electrodes, and
a distance between one of the first terminal electrodes and one of the second terminal electrode is smaller than a distance between the anode terminal and the cathode terminal.

20. The capacitor according to claim 1,
wherein the first capacitor element further comprises a cathode terminal exposed to the second surface and coupled to the first through-hole electrode, and an anode terminal exposed to the second surface and coupled to the valve metal sheet, and
the cathode terminal is connected to the first electrode, and the anode terminal is connected to the second electrode, respectively, with an anisotropic conductive paste.

21. The capacitor according to claim 1, wherein the valve metal sheet is made of any of aluminum, tantalum and niobium.

22. The capacitor according to claim 1, further comprising a substrate provided between the first capacitor element and the second capacitor element, and having a first penetrating electrode electrically coupled to the first through-hole electrode and the first electrode and a second penetrating electrode electrically coupled to the valve metal sheet and the second electrode.

23. The capacitor according to claim 22, wherein the substrate comprises an insulating material.

24. The capacitor according to claim 23, wherein the insulating material is an organic material.

25. The capacitor according to claim 24, wherein the organic material comprises at least any of polyimide resin, epoxy resin, phenol resin, and silicon resin.

26. The capacitor according to claim 23, wherein the insulating material is an inorganic material.

27. The capacitor according to claim 26, wherein the inorganic material comprises at least any of alumina, glass, quartz and ceramic.

28. The capacitor according to claim 22, wherein the substrate comprises a conductive material.

29. The capacitor according to claim 28, wherein the conductive material is a metal.

30. The capacitor according to claim 29, wherein the metal is any of copper, silver, and silicon.

31. The capacitor according to claim 22, wherein the substrate is bonded to the first capacitor element with an adhesive agent.

32. The capacitor according to claim 1, further comprising a substrate made of a conductive material and provided between the first capacitor element and the second capacitor element; including any of a first penetrating electrode electrically coupled to the valve metal sheet and the second electrode and electrically insulated from the first through-hole electrode and the first electrode, and a second penetrating electrode electrically coupled to the first through-hole electrode and the first electrode and electrically insulated from the valve metal sheet and the second electrode.

33. The capacitor according to claim 32, wherein the substrate is bonded to the first capacitor element with an adhesive agent.

34. The capacitor according to claim 1, wherein the first electrode and the second electrode are provided in an inner layer of the dielectric layer, respectively, in the second capacitor element, and
the second capacitor element further has a third through-hole electrode electrically coupled to the second electrode, electrically insulated from the first electrode, and penetrating the dielectric layer, is further provided.

35. The capacitor according to claim 1, further comprising a reinforcing plate attached to the collector layer.

* * * * *